Figure 1:
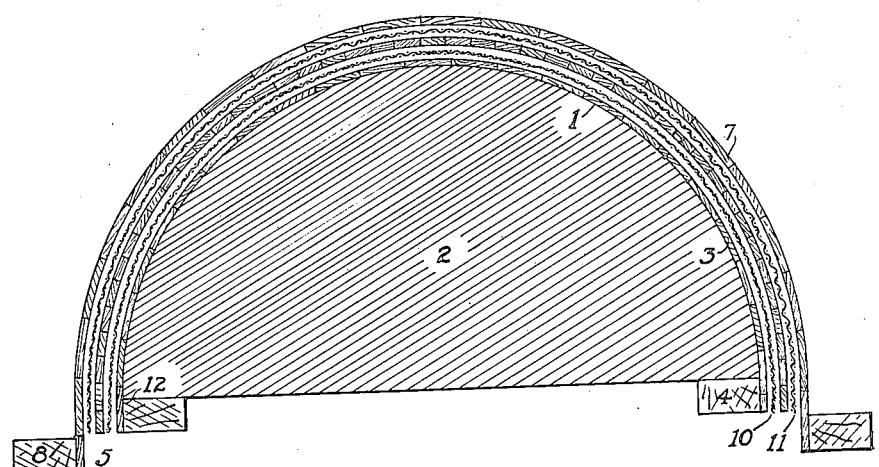

M. LOUGHEAD.
PROCESS OF MANUFACTURING CURVED FORMS OF PLYWOOD OR FIBROUS COMPOSITIONS.
APPLICATION FILED AUG. 12, 1919.

1,425,113.

Patented Aug. 8, 1922.

Witnesses

Inventor
Malcolm Loughead

UNITED STATES PATENT OFFICE.

MALCOLM LOUGHEAD, OF SANTA BARBARA, CALIFORNIA, ASSIGNOR OF ONE-FOURTH TO ALLEN H. LOUGHEAD, ONE-FOURTH TO JOHN K. NORTHROP, AND ONE-FOURTH TO ANTHONY STADLMAN, ALL OF SANTA BARBARA, CALIFORNIA.

PROCESS OF MANUFACTURING CURVED FORMS OF PLYWOOD OR FIBROUS COMPOSITIONS.

1,425,113.      Specification of Letters Patent.      Patented Aug. 8, 1922.

Application filed August 12, 1919. Serial No. 317,025.

*To all whom it may concern:*

Be it known that I, MALCOLM LOUGHEAD, a citizen of the United States, residing at Santa Barbara, county of Santa Barbara, State of California, have invented new and useful Improvements in the Processes of Manufacturing Curved Forms of Plywood or Fibrous Compositions, of which the following is a specification.

This invention relates to the process of constructing layers of wood or fibrous composition to be applied to the surface of a mold or form, in such a manner that each layer can be applied as a unit over the whole surface to be covered; and has for its object the considerable shortening of the time required to apply the layers, so that the whole unit of plywood or fibrous composition may be subjected to pressure before any portion of the adhesive used in its manufacture has set.

The present method of applying layers in the manufacture of curved forms of plywood involves the individual fitting, gluing and fastening in place of a number of strips or pieces which are laid side by side, or edge to edge, to cover the required surface. The limitations of this method make it impossible to subject the whole of a large unit of plywood to effective pressure at one time, as the adhesive used to fasten the first layers together sets before it is possible to complete the application of the strips or pieces forming the final layer.

In the application of my process, the individual strips of or pieces of wood are fitted to the surface on which the plywood is to be formed, or on a duplicate surface, and temporarily fastened in position. The strips or pieces are then secured in the desired position and relation to each other by the application of a temporary or permanent binding, or by fastening to a removable form, or by both of these methods in combination.

The completed layer may then be removed as a unit, and is ready for use at any time.

In the manufacture of the desired plywood form, two or more layers of wood, made as described above, are applied to the mold with a suitable adhesive or binding between the layers, and the whole surface subjected to pressure before any portion of the adhesive has set.

This process makes possible the construction of curved plywood or fibrous composition forms which are more homogeneous, compact, and much cheaper to fabricate, than those made by any other process now in use. It is particularly applicable to the manufacture of airplane bodies, pontoons, supporting surfaces and control surfaces, but can be used to advantage in the manufacture of any curved forms of plywood or fibrous material.

The accompanying drawing illustrates a typical application of my invention as applied to the manufacture of aircraft bodies.

Figure 2:
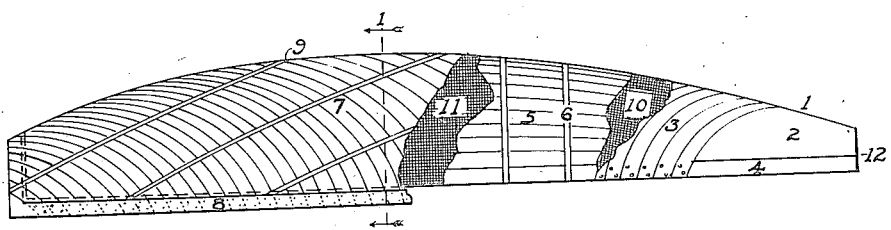

Figure 1 is an enlarged transverse cross-section through the mold which forms one half of the shell of a fusilage. The layers of wood are shown disproportionately large, and with a space between, in order to make the figure more distinct. Figure 2 is a side elevation of the same mold with the several layers of material cut away to show the process employed.

Similar numerals refer to similar parts throughout the several views.

The surface 1 of the mold or form 2 is finished to the shape desired in the completed plywood shell. The strips 3 are laid diagonally on the surface 1 and secured in place by tacking the ends to the tacking strip 4, which is a part of the mold 2. The second layer 5 is then laid longitudinally over the first layer 3 and fastened temporarily to the extreme ends of the mold 2. Strips of tissue paper or thin cloth 6, covered with glue, are then laid across the strips 5 at intervals along the whole length of the mold. The glue is allowed to set, and the ends being unfastened, the whole layer 5 may be removed from the mold 2 and is ready for use as a unit. The third layer 7 is then laid diagonally in the opposite direction from the layer 3, the ends of the strips being secured to the form 8 which extends entirely around the mold 2, and a few binding strips 9 are glued across the strips 7 to maintain the desired spacing across the center of the mold. When the strips 9 have set in place, the form 8 is removed, carrying the whole of layer 7 with it.

When it is desired to manufacture a plywood shell, the first layer 3 is coated with glue and covered with a layer of fabric 10. The second layer 5 is then laid over the fabric 10 and is in its turn coated with glue and covered with the fabric 11. Finally, the form 8, carrying the third layer 7, is put in place and the whole surface subjected to a uniform pressure until the glue sets,—the form 8 being drawn down so as to hold all the layers tightly against the mold until the external pressure is applied.

After the glue sets, the plywood is cut around the edge of the mold on the line 12 and can then be removed from the mold 2, while the tips of the strips 3 and 7, left fastened to the tacking-strip 4 and the form 8, respectively, are removed for the repetition of the process.

I claim:—

1. The process of manufacturing curved shells, which consists of erecting a primary layer by bending strips of stock to a curved form and securing the ends of the strips in place so that the layer becomes a unit; and then erecting superposed layers, each of strips of the stock, so that each layer is an independent and separate unit; then separating the unitary layers; and then adhesively securing the unitary layers one upon the other in complementary relation.

2. The process of manufacturing curved shells, which consists of erecting separable layers by bending strips of stock to form respective layers, beginning the first layer upon a curved mold, and arranging the strips of each layer at material angles to the strips of each adjacent layer; then separating the layers as units from each other, and finally adhesively securing the unitary layers in nested relation.

3. The process of manufacturing curved shells, which consists of erecting separable layers by bending strips of stock to form respective layers, beginning the first layer upon a curved mold, and arranging the strips of each layer at material angles to the strips of each adjacent layer; then separating the layers as units from each other, finally adhesively securing the unitary layers in nested relation, and, while so securing the layers, introducing a layer of fabric between each two adjacent layers.

Dated August 7th, 1919.

MALCOLM LOUGHEAD.